No. 813,248. PATENTED FEB. 20, 1906.
J. R. SPEER & G. H. HARVEY.
GLASS DRAWING APPARATUS.
APPLICATION FILED JULY 25, 1905.
5 SHEETS—SHEET 1.
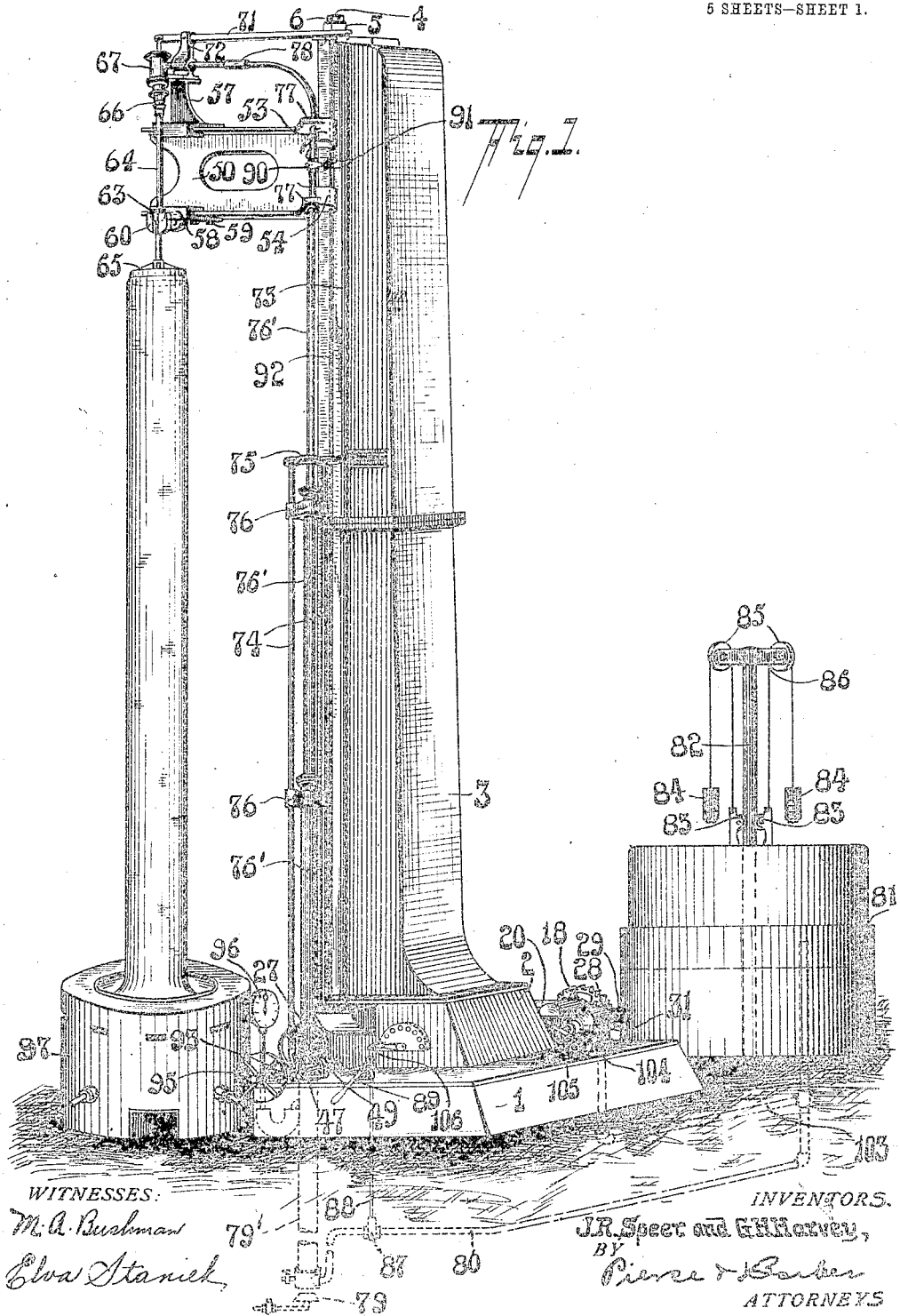
WITNESSES:
M. A. Bushman
Elva Stanick
INVENTORS.
J. R. Speer and G. H. Harvey,
BY
Pierce & Barber
ATTORNEYS

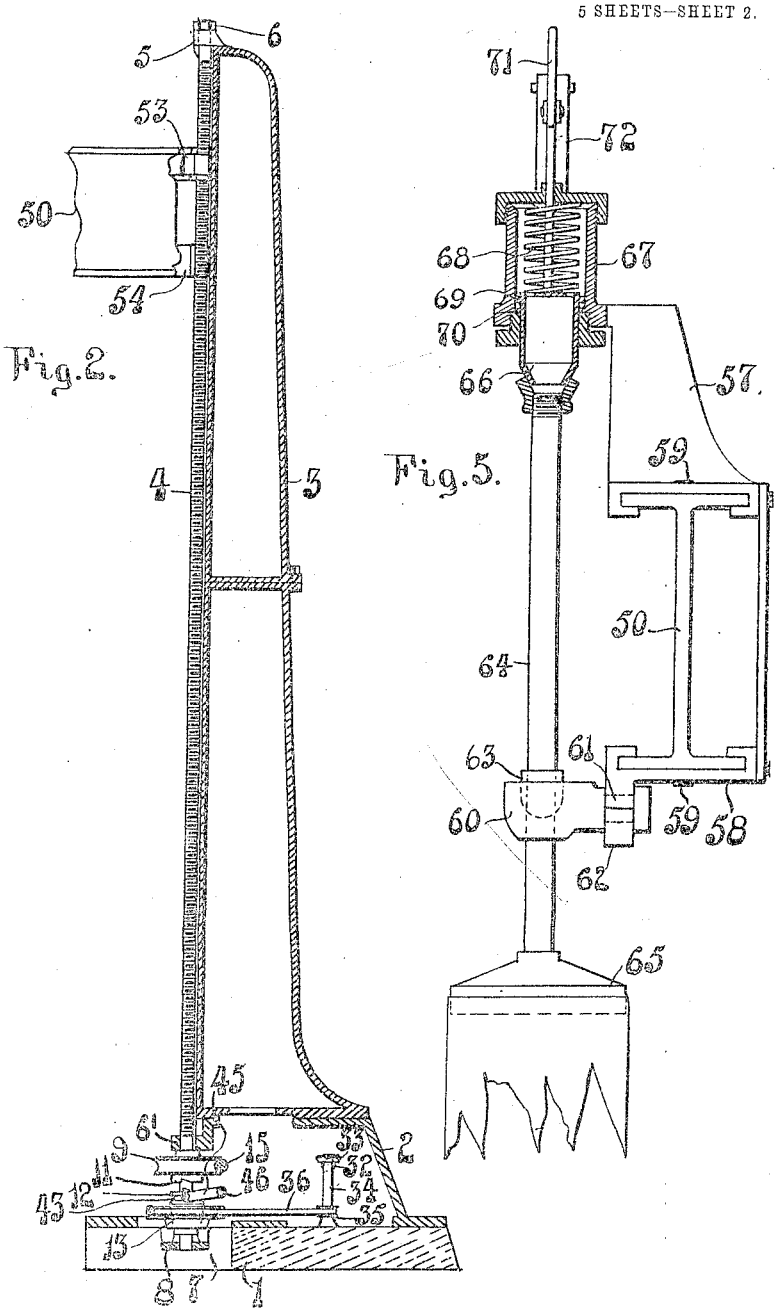

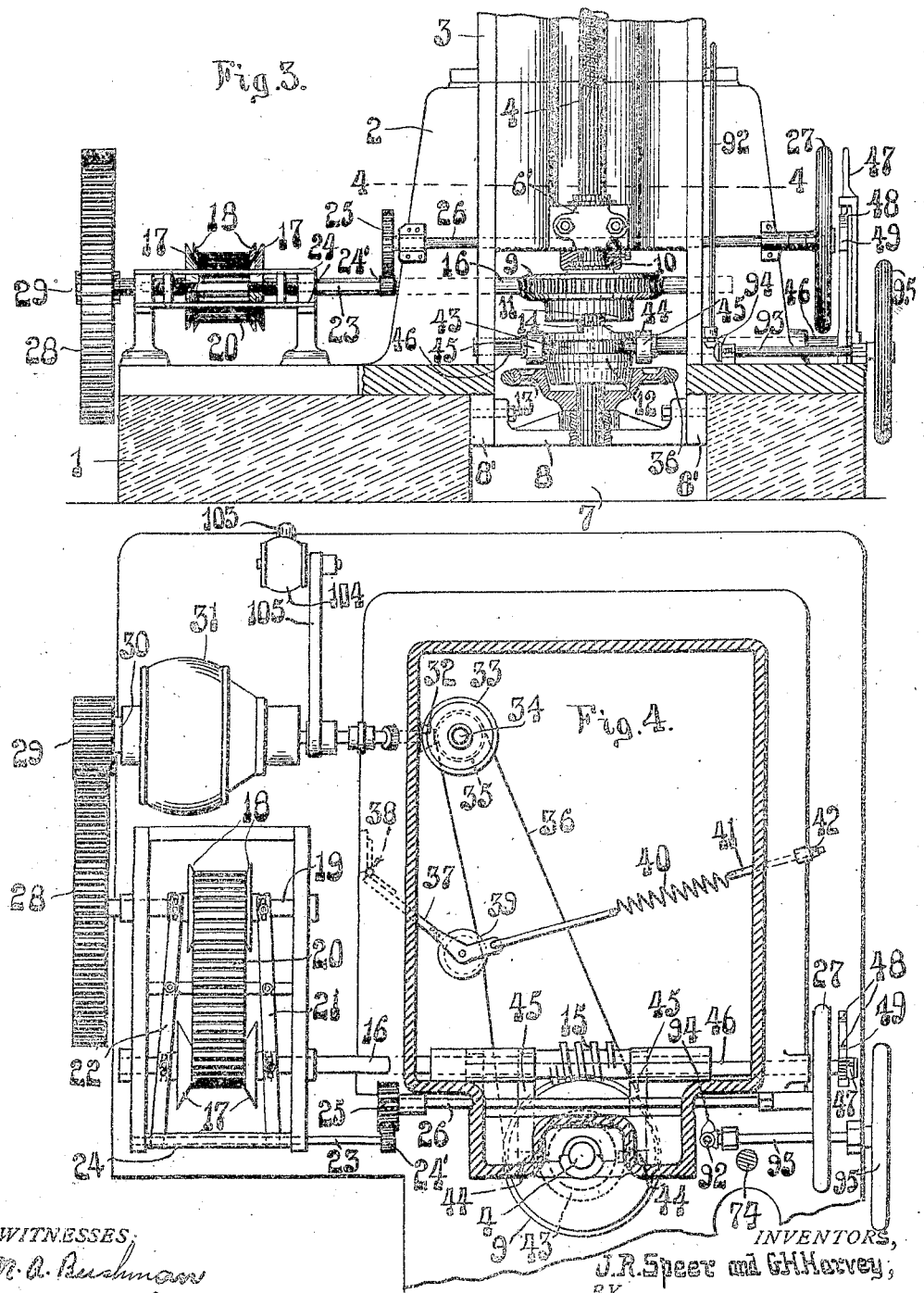

No. 813,248. PATENTED FEB. 20, 1906.
J. R. SPEER & G. H. HARVEY.
GLASS DRAWING APPARATUS.
APPLICATION FILED JULY 25, 1905.
5 SHEETS—SHEET 4.
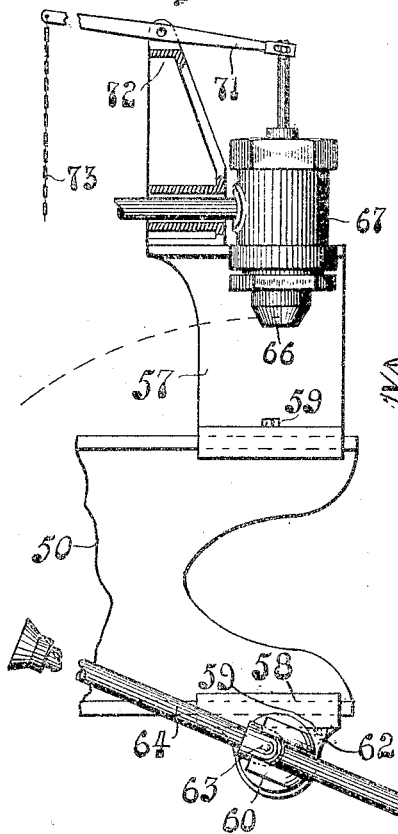
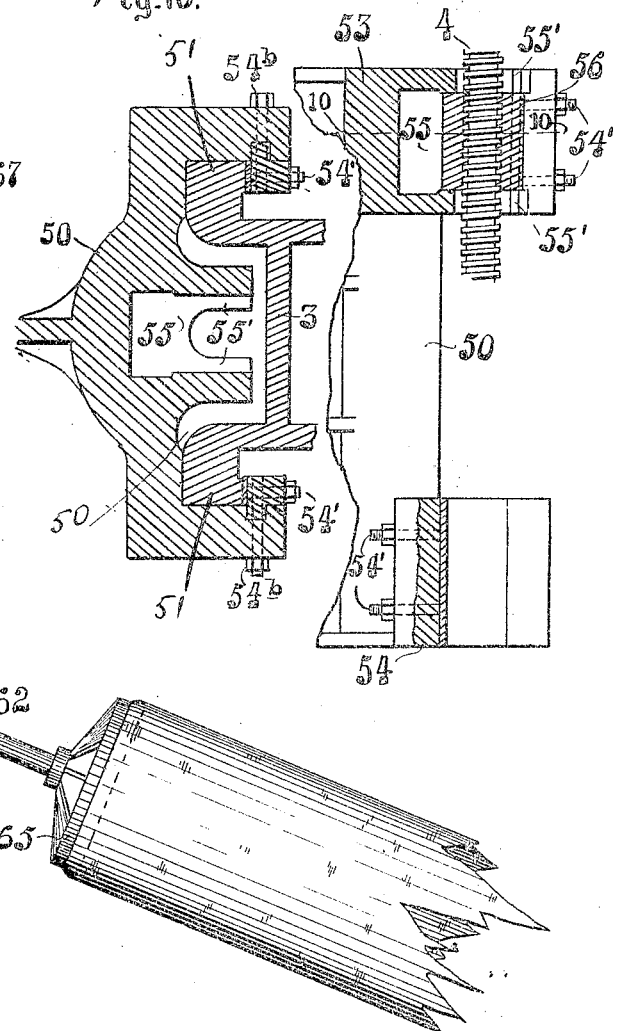
WITNESSES:
M. A. Bushman
Eva Staniek
INVENTORS,
J. R. Speer and G. H. Harvey
BY Pierce & Barber
ATTORNEYS.

No. 813,248.  
PATENTED FEB. 20, 1906.  
J. R. SPEER & G. H. HARVEY.  
GLASS DRAWING APPARATUS.  
APPLICATION FILED JULY 25, 1905.  
5 SHEETS—SHEET 5.
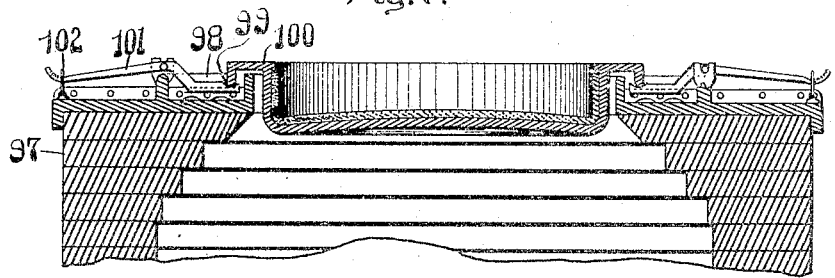
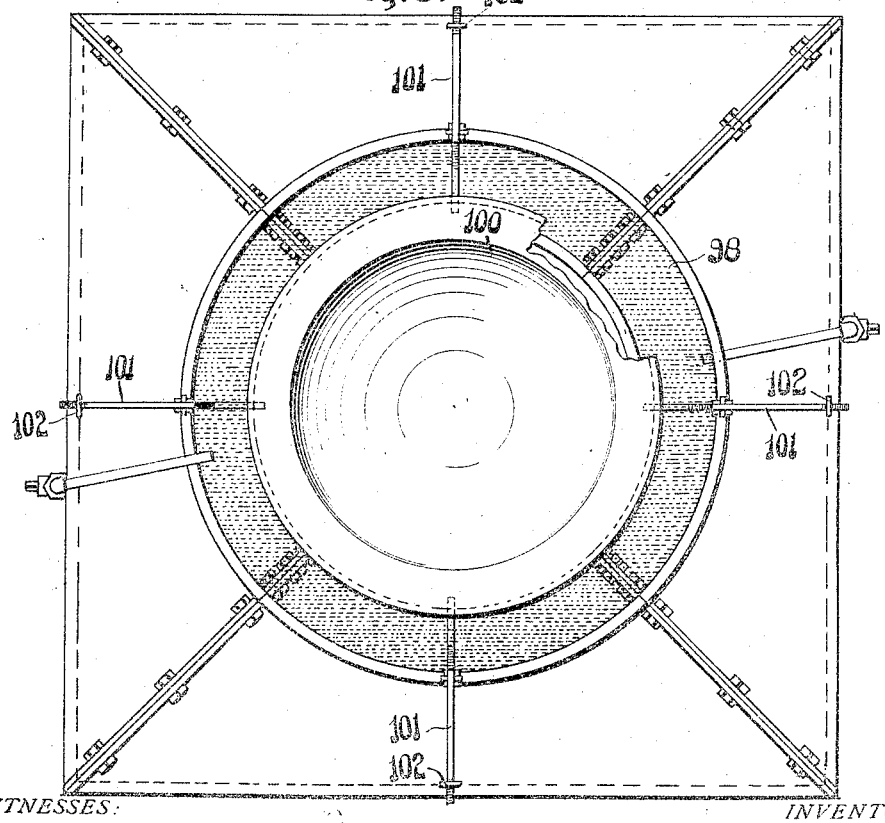

UNITED STATES PATENT OFFICE.

JAMES RAMSEY SPEER, OF PITTSBURG, AND GEORGE H. HARVEY, OF GLENFIELD, PENNSYLVANIA, ASSIGNORS TO BROWNSVILLE GLASS COMPANY, OF PITTSBURG, PENNSYLVANIA, A CORPORATION OF PENNSYLVANIA.

GLASS-DRAWING APPARATUS.

No. 813,248.     Specification of Letters Patent.     Patented Feb. 20, 1906.

Application filed July 25, 1905. Serial No. 271,142.

*To all whom it may concern:*

Be it known that we, JAMES RAMSEY SPEER, residing at Pittsburg, and GEORGE H. HARVEY, residing at Glenfield, in the county of Allegheny and State of Pennsylvania, citizens of the United States, have invented or discovered new and useful Improvements in Glass-Drawing Apparatus, of which the following is a specification.

The objects of our invention are to provide efficient and simple means for drawing glass, preferably in hollow form, from a molten mass in a more uniform and perfect manner than has been possible heretofore.

Prior to the present invention the manufacture of glass cylinders has been on the order of hit or miss. In other words, there has been no mechanical means provided that could absolutely control the diameter of the cylinders and the thickness of their walls during the drawing thereof.

Among the many desirable features that machines for drawing glass cylinders should have are the following: First, they should be capable of drawing the glass in true vertical alinement and have easy and quick adjustments, preferably both direct and indirect; second, they should have means for absolutely controlling the transmission of air toward and its admission into the cylinders during their formation; third, they should preferably have means for regulating the temperature of the air before its admission to the drawing-tools and cylinders; fourth, they should provide means for equalizing the pressure of the air within the cylinders during their formation; fifth, they should have means for holding the drawing-tool in true alinement and perfectly rigid during the drawing operation; sixth, they should preferably provide a rigid adjustable connection for supplying air to the drawing-tool; seventh, they should preferably have means for adjusting the several drawing-tools which may be used, so that the drawing edges or faces thereof are parallel to the surface of the molten glass to be drawn, and, eighth, they should provide means for adjusting the receptacles from which the glass is drawn so that the glass therein has an equidistant depth at all points, having the same relative position with reference to the bottom of the drawing-tools. Other objects will appear hereinafter.

To obtain these and other features, we have devised the machine shown in the drawings accompanying this specification; but it is to be understood that our invention is not to be limited to a machine having all or the precise features shown, since some of them may be omitted or modified.

Our drawings are illustrative of one manner only by which the spirit of our invention may be embodied.

Referring to the drawings, Figure 1 is a perspective of our machine, showing a cylinder drawn, but still connected to the molten bath; Fig. 2, a vertical section of the same with the cross-arm broken off and the furnace omitted; Fig. 3, a partial front elevation, the base below the mast or standard being in vertical section; Fig. 4, a horizontal section on line 4 4 of Fig. 3; Fig. 5, an end view of the cross-arm and its connections; Fig. 6, a side elevation of the cross-arm, showing the drawing-tool tilted in the act of bringing a cylinder to a horizontal position; Fig. 7, a vertical section of the upper part of an auxiliary furnace and the pot or receptacle from which the glass is drawn, showing particularly the manner by which we preferably level the receptacle; Fig. 8, a plan of Fig. 7; partly broken away; Fig. 9, a detail of the cross-arm partly broken away and in vertical section; and Fig. 10, a detail of the cross-arm in horizontal section on line 10 10 of Fig. 9 with the nut and screw omitted.

On the drawings, 1 represents the foundation, on which sits the hollow pedestal or base 2 of the column, mast, or standard 3. In a vertical groove or recess in the front of the standard 3 we place the screw 4, which is preferably suspended from its upper end in order to prevent transmission thereto of vibrations and shocks produced by the machinery working in or near its base. The upper end of the screw therefore has bearing in the lug 5, which overhangs the said recess and is suspended by the nut 6 or its equivalent, resting on the said lug. The screw is supported laterally by the bearing 6' and also by the lug or bearing 8 at the bottom of the recess 7, which lug is screwed to the lugs 8' 8', extending downwardly from the base 2.

Loose on the screw-shaft 4, just beneath the lug or bearing 6', is the worm-wheel 9, which is prevented from dropping on the shaft by means of the annular rib 10 on the shaft, seated in a corresponding groove in the wheel. The lower side of this wheel has rigid therewith the clutch member 11, which cooperates with the clutch member 12, slidable toward and from the wheel 9 and caused to rotate with the screw-shaft by means of the spline 14 on the shaft. On the screw-shaft below the clutch member 12 is the loose pulley 13, having in its upper side the recess to receive the hub on the bottom of the pulley, the recess and hub forming friction clutch members.

The wheel 9 is driven by the worm 15 on the shaft 16, on which is secured one pair of slidable members 17 of a variable-speed mechanism, the other pair of members 18 being on the shaft 19 and connected to the members 17 by the belt 20. Each pair of members 17 and 18 consists of cones having their tapering portions extending toward each other, the pairs of cones constituting pulleys for the belt 20. The two members on one side of the belt are connected together by the lever 21, and the two members on the opposite side of the belt are connected together by the lever 22, the levers being pivoted centrally between the pairs of members 17 and 18. The levers are connected to the hubs of the members by means of pins in the hubs extending through slots in the levers. The right and left screw-threads on the shaft 23 work in the forward ends of the levers, which are guided horizontally by the cross-bars 24, secured to the frame of the variable-speed mechanism. The shaft 23 is provided with the pinion 24', geared to the gear-wheel 25 on the shaft 26, having thereon the hand-wheel 27. The shaft 19 has secured thereon the spur-gear 28, driven by the pinion 29 on the shaft 30 of the motor 31.

The motor-shaft carries the bevel-gear wheel 32, meshing with the bevel-gear wheel 33 on the vertical shaft 34 in the pedestal 2. The shaft 34 has thereon the pulley 35, connected to the pulley 13 by the belt 36.

37 is an arm pivoted at 38 and carrying the idle belt-tightening pulley 39, held against the belt 36 by the spring 40, secured to the arm, and the rod 41, adjustable to vary the tension of the spring by turning the nut 42.

The hub of the clutch 12 is provided with the circumferential groove 43, in which is seated the pins 44, extending thereinto from the two arms 45, one on each side of said hub, and both secured to the shaft 46, having the operating-handle 47 near the hand-wheel 27. The handle 47 is provided with any suitable catch to lock into notches 48 in the segment 49 at the side of the handle.

Slidable vertically along the front of the standard 3 is the cross-arm or carriage 50 guided by vertical ribs or tracks 51, which are a part of the standard 3 and lie on opposite sides of the screw 4 and have each a front, a lateral, and a rear face to contact with the guiding-recesses 52 in the cross-arm. These recesses are in opposing faces of two pairs of rearwardly-extending lugs, one pair 53, being at the upper side of the cross-arm and the other pair 54, at the lower side thereof. The recesses are provided with suitable liners and adjusting-bolts 54' and have their rear walls detachable by means of the bolts 54ᵇ, in order that the cross-arm may be assembled and taken off or the parts may be got at quickly for repair or inspection.

Between the upper pairs of lugs 53 is the recess 55, open at its rear to receive the nut 56 in which the screw 4 works. The top and bottom flanges 55' prevent the nut from moving up or down independently of the cross-arm, and the lateral walls of the recess prevent the rotation of the nut. The open rear side of the recess not only provides for the insertion of the nut, but allows the cross-arm to be removed without removing the screw or separating the nut and screw.

The cross-arm or carriage 50 is an I-beam, whose upper flanges guide and hold rigidly the support 57 for the air connection to the drawing-tool, and whose lower flanges guide and hold rigidly the support 58 for the drawing-tool. The two supports are adjustable by the set-screws 59. These adjustments enable the drawing-tool to be set and held in perfect alinement with the drawing pot or receptacle. The support 58 carries the form 60, provided with the horizontal neck 61, rotatable in a bearing in the flange 62. The branches of the fork are recessed to receive the rounded collar 63 on the hollow stem 64 of the drawing-tool, having at its lower end the expanded rim or bait 65, to which the glass becomes directly attached. The upper end of the stem 64 is provided with an upwardly-flaring portion to receive the lower tapered end of the tubular connector 66, which fits an opening in the bottom of the cylinder 67, carried by the support 57. The connector 66 is forced downwardly by the spring 68, seated in the cylinder and exerting pressure on the top of the cylinder and the connector, which is prevented from being pushed out of the cylinder by the flange 69, engaging with the stop-flange 70 in the cylinder. The connector is provided with a rod extending up through the top of the cylinder and connected to one end of the lever 71, pivoted on the lug 72 in the support 57. The opposite end of the lever has secured thereto a chain 73 or the like hanging down near the handle 47.

A pair of vertical guide-rods 74 are supported at their lower ends in the foundation and at their upper ends by the bracket 75, attached to the standard 3. These rods guide the cross-heads 76, to which the sections 76' of a vertical telescopic air-transmitting tube are secured to keep the sections in strict vertical alinement, thus preventing the binding of the sections on each other and providing a steady smooth operation. The upper telescopic member is connected to the cross-arm by means of the ears 77, through which this member extends. It is connected to the cylinder 67 and contains a suitable means to permit the adjustment of the supports 57 and 58 hereinbefore described. We have shown the right and left threaded nut 78 in the horizontal portion of the inlet-pipe to permit the said adjustment; but other means may be substituted.

In order to heat the air before its admission to the drawing-tool, we provide the burner 79 at the lower end of the stationary vertical air-pipe 79'; but the burner may be elsewhere located or the heating of the air otherwise provided for or even omitted if the conditions do not require it. The vertical air-pipe 79' is connected by the pipe 80 to the interior of the holder 81, which, as shown, is not materially different from gas-holders in common use, except that the upper section is guided on a center mast or post 82, this section being provided with antifriction guide-wheels 83, which are in rolling contact with different sides of the post. The upper section is counterbalanced by the weights 84, hung on cords which pass over the sheaves 85 on the cross-arm 86 on the post. The pipe 80 is provided with the valve 87, of any desired type, the valve-stem 88 being provided with the operating-handle 89 near the handle 47.

Near the top of the air-inlet pipe and preferably between the top and bottom guide-lugs 53 and 54 we locate the valve 90, whose stem is operated by the bevel-gearing 91, driven by the square vertical shaft 92. The lower end of the shaft is operated by the shaft 93, through the interposed bevel-gearing 94. The shaft 93 is provided with the hand-wheel 95 near the hand-wheels and operating-handles mentioned. In the vicinity of said hand-wheels and handles is the gage 96, connected with the inlet-pipe to the drawing-tool to indicate to the operator the pressure of the air therein. The type of the gage is not essential, provided it be one which will show considerable movement for a very slight change of pressure.

97 represents the furnace from which the molten glass is drawn. In Figs. 7 and 8 we show the details of the upper part of the furnace, which is an auxiliary furnace and, preferably, not the one in which the ingredients of the glass are mixed and melted. The top of the furnace is provided with an annular water-seal trough 98 to receive the downwardly-extending annular flange 99 around the edge of the drawing pot or receptacle 100, the flange being below the surface of the water in the trough. The flange 99 rests upon the inner ends of the levers 101, fulcrumed on the outer rim of the trough and having their outer ends curved upwardly and within the swinging stirrups or loops 102. The outer ends of the levers are provided with notches for the reception of the loops, so that the pot can be nicely adjusted to cause the glass therein to have corresponding portions of the same depth. This is found to be important, as the glass drawn from portions of the pot where the glass is deeper will not have the same thickness as the glass drawn from the shallower portions.

The pipe 80 is shown connected to the pipe 103, which connects with the air-pump 104, driven by the motor 31, through the belt 105, which can be thrown off the pulleys when the pump is not to be in use.

106 represents the controller-handle by which the motor 31 is controlled, this handle being near the other hand-wheels and handles.

The operation is as follows: Assuming that a batch of molten glass has been deposited in the pot 100, which has been leveled, as described, the cross-arm or carriage 50 is lowered until the lower end of the bait 65 of the drawing-tool enters the molten glass in the pot at a certain distance. When the glass has sufficiently adhered thereto to carry it up from the pot in sheet form, the operator opens the valve 87 by actuating the handle 89 and the valve 90 by the hand-wheel 95, whereupon air from the holder 81 is admitted to the telescopic pipe 76' and the hollow drawing-tool, the air being heated by the burner 79, if preferred. The motor is started now or has been previously started by moving the controller-handle 106 and the desired speed of the motor obtained. If the handle 47 has been set at the center notch of the segment 49, the motor will not actuate the screw 4 because the clutch member 12 will not be in engagement with either the clutch member 11 or the pulley 13. Before the motor is started the handle 47 is operated to cause the clutch members 11 and 12 to interlock, whereupon the screw 4 will cause the cross-arm 50 and the drawing-tool carried thereby to ascend. When the motor is started, a cylinder of glass is at the same time drawn by the tool from the pot 100. During the upward travel of the drawing-tool the speed of travel may be changed by rotation of the hand-wheel 27, which causes an evident change in the relative sizes of the driving and driven portions of the variable-speed cones, so that the speed of the belt 20 will be correspondingly varied. By this mechanism the speed is gradually changed, which is important in drawing glass, as sudden changes in the speed of drawing materially change the quality of the product. During the upward movement of the drawing-tool it may be necessary to control the admission of air passing into the cylinder, because the pressure within the glass cylinder sometimes varies from the heat of the molten glass or from other causes, so as to cause an unequal expansion of the cylinder and consequently produce cylinders of an irregular diameter from end to end. If for any cause the air-pressure should vary within the glass cylinder during its drawing, the variation would at once be shown by the gage 96. The operator on noticing the fluctuation would at once rotate the hand-wheel 95, so as to increase or decrease the flow of air to the cylinder, thus regulating the air-supply approximately simultaneously with the appearance of the fluctuation. The fluctuation in pressure may also be counteracted by the operation of the variable-speed mechanism by means of the hand-wheel 27, so that the pressure may be reduced by an increased speed of drawing or increased by a decreased speed. After the drawing has been completed, the handle 47 can be thrown to disconnect the clutch members 11 and 12 to stop the rotation of the screw, or the motor can be stopped, the valve closed, and the glass severed from that in the pot. The operator then pulls down on the chain 73, which lifts the connector 66 out of its seat in the upper end of the stem 64 of the drawing-tool, and an attendant with a proper tool now swings the lower end of the cylinder clear of the furnace, the swivel-neck 61 permitting the cylinder to swing. The operator now throws the lever 47, so as to cause the clutch member 12 to frictionally engage the pulley 13, which causes the screw to rotate, so as to lower the cross-arm 50 and drawing-tool rapidly with the glass cylinder attached thereto. The attendant moves the lower end of the cylinder farther and farther away from the furnace as the cross-arm 50 is lowered, until finally the cylinder becomes horizontal. The drawing-tool is disconnected from the fork 60, and the glass is supported on proper trusses. (Not shown.) The cylinder is then cracked off from the drawing-tool, a fresh drawing-tool substituted on the said fork, after which the operation is repeated. The belt 36, which we prefer to use to lower the glass cylinders, operates the screw at a faster speed than the work-gearing could without unduly jarring the machinery and cylinders. The belt-drive for the screw may be used both to raise and lower the glass cylinders, if the worm and spur gears produce so much vibration as to distort the glass.

We have described our mechanism and its operation in detail; but we have not intended thereby to imply that the structure drawn exhausts the embodiments of the principles which we employ, either in the elements or their combinations.

Having described our invention, we claim—

1. In the art of drawing hollow glassware, a vertically-movable drawing-tool, and a pipe connected thereto to supply fluid-pressure to the interior of the hollow ware, said pipe including a telescopic portion extensible during the upward movement of the tool to permit the vertical movements of the drawing-tool without interrupting the fluid-supply pipe.

2. In the art of drawing hollow glassware, a drawing-tool, a vertically-movable carriage therefor, means for moving the carriage upwardly at the desired speed and a second means for moving the carriage downwardly at a greater speed.

3. In the art of drawing hollow glassware, a hollow drawing-tool, a fluid-supply pipe, and a rigid detachable connector between them to hold the drawing-tool rigid.

4. In the art of drawing hollow glassware, a drawing-tool, means for supplying fluid-pressure to the interior of the glassware, and a movable member constituting a part of the fluid-supply conduit for locking the drawing-tool in operative position.

5. In the art of drawing hollow glassware, a drawing-tool, means for raising and lowering the same, a driving means, separate driving connections between the raising and lowering means and the driving means.

6. In the art of drawing hollow glassware, a drawing-tool, means for raising and lowering the same, a driving means, and separate driving connections between the raising and lowering means and the driving means, one of the connections being flexible to prevent vibration of the said means.

7. In the art of drawing hollow glassware, a drawing-tool, a screw for raising and lowering the same, two driving connections therefor, and means for making operative either connection.

8. In the art of drawing hollow glassware, a vertically-movable carriage, a fluid-supply connection carried thereby, a valve in said connection and non-traveling means for operating said valve at all positions of the carriage.

9. In the art of drawing hollow glassware, a drawing-tool, a carriage to support the same, a standard to guide the carriage, a screw for operating the carriage, and means for suspending the screw from a part relatively distant from its lower end.

10. In the art of drawing hollow glassware, a drawing-tool, a carriage to support the same having therein a socket, a standard to guide the carriage, a screw for operating the carriage, and a nut on the screw and in said socket.

11. In the art of drawing hollow glassware, a traveling drawing-tool, a pipe for supplying a fluid within the draw and a telescopic portion connected thereto extensible during the draw, whereby excess pressure of fluid within the draw is minimized by the gradual increasing area of the telescopic portions during the upward travel of the drawing-tool.

12. In the art of drawing hollow glassware, a traveling drawing-tool, means for transmitting fluid-pressure through the tool to the interior of the draw, a plurality of means for controlling the flow of the fluid to the said means, one of the controlling means traveling with the tool and means by which the latter controlling means may be operated during the entire draw.

13. In the art of drawing glassware, a drawing-tool, a carriage therefor, a screw adapted to rotate and a non-rotating nut adapted to move said carriage by the rotation of said screw.

Signed at Pittsburg this 21st day of July, A. D. 1905.

J. RAMSEY SPEER.
GEORGE H. HARVEY.

Witnesses:
F. N. BARBER,
ALICE E. DUFF.